United States Patent [19]
Kawabata

[11] Patent Number: 5,251,929
[45] Date of Patent: Oct. 12, 1993

[54] HYDRAULIC SUPPLY ARRANGEMENT FOR USE WITH ACTIVE AUTOMOTIVE SUSPENSION OR THE LIKE

[75] Inventor: Kazunobu Kawabata, Yokohama, Japan

[73] Assignee: Nissan Motor Company, Ltd., Japan

[21] Appl. No.: 759,585

[22] Filed: Sep. 11, 1991

[30] Foreign Application Priority Data

Sep. 12, 1990 [JP] Japan ................... 2-241452

[51] Int. Cl.⁵ ........................... B60G 17/00
[52] U.S. Cl. ...................... 280/707; 364/424.05
[58] Field of Search .............. 280/707, 714, 772; 364/424.05

[56] References Cited

U.S. PATENT DOCUMENTS

| | | | |
|---|---|---|---|
| 4,848,790 | 7/1989 | Fukunaga | 280/707 |
| 4,905,152 | 2/1990 | Kawabata | 364/424.05 |
| 5,033,770 | 7/1991 | Kamimura | 364/424.05 |
| 5,062,660 | 11/1991 | Saton et al. | 364/424.05 |
| 5,083,811 | 1/1992 | Sato et al. | 280/707 |
| 5,085,459 | 2/1992 | Sato | 280/707 |
| 5,102,161 | 4/1992 | Williams | 280/707 |
| 5,113,345 | 5/1992 | Mine | 364/424.05 |

FOREIGN PATENT DOCUMENTS

| | | | |
|---|---|---|---|
| 63-251313 | 10/1988 | Japan . | |
| 193704 | 7/1990 | Japan | 280/707 |
| 290709 | 11/1990 | Japan | 280/707 |
| 3-513 | 1/1991 | Japan | 280/707 |

*Primary Examiner*—Karin L. Tyson
*Attorney, Agent, or Firm*—Lowe, Price, LeBlanc & Becker

[57] ABSTRACT

In order to reduce the pump load on a prime mover and improve fuel consumption characteristics, the mode in which a variable displacement pump is operated is varied in accordance with a consumption estimate which is modified using engine speed and lateral acceleration data inputs. A basic consumption estimate is derived based on sensor inputs which are indicative of the amount of work a servo is producing and increased by increasing the level based on the lateral acceleration level. The amount by which the basic estimate is boosted is variable with vehicle speed and/or lateral acceleration level.

11 Claims, 11 Drawing Sheets

HYDRAULIC SUPPLY ARRANGEMENT FOR USE WITH ACTIVE AUTOMOTIVE SUSPENSION OR THE LIKE

BACKGROUND OF THE INVENTION

1. Field of the Invention

The present invention relates generally to a source of hydraulic fluid under pressure and more specifically to a source of hydraulic fluid under pressure which is particularly suited for use with an active suspension for the control of vehicular roll and pitch.

2. Description of the Prior Art

JP-A-63-251313 discloses an arrangement wherein a variable displacement type pump arrangement has been operatively connected with a source or rotational energy such as a prime mover (e.g. internal. combustion engine) of an automotive vehicle, and the output of the pump supplied to an active vehicle suspension. In this arrangement vertical, lateral and fore/aft accelerations are used to determine the change in vehicle posture. When the change in posture exceeds a predetermined level, the amount of discharge is increased above a level used when the vehicle is stationary, and supplied (by way of example) to a hydraulic fluid cylinder operatively connected between the sprung and unsprung components of the vehicle suspension.

However, this arrangement has suffered from a problem in that even though it aims to take advantage of the fact that the amount of power which is consumed when the vehicle is stationary is less than that when the vehicle is running, the amount of pump discharge is always increased in response to large changes in vehicle posture.

As the time related variation in lateral acceleration at high vehicle speeds is higher than that at low speeds, it is necessary to take the lateral vehicle acceleration into account when estimating the amount of hydraulic fluid which is required during high speed modes of operation, the pump output is controlled on the high side during both high and low speed operations with the result that the pump load is undesirably increased and exerts a detrimental effect on the vehicle fuel economy.

SUMMARY OF THE INVENTION

It is an object of the present invention to provide a pump control system which reduces pump load by modifying the estimated hydraulic fluid consumption using vehicle speed in manner which derives an optimal value.

In brief, the above object is achieved by an arrangement wherein the mode in which a variable displacement pump is operated is varied in accordance with a consumption estimate which is modified using engine speed and lateral acceleration data inputs. In specific instances, a basic consumption estimate is derived based on sensor inputs which are indicative of the amount of work a servo is producing and increased by increasing the level based on the lateral acceleration level. The amount by which the basic estimate is boosted is variable with vehicle speed and/or lateral acceleration level.

More specifically, a first aspect of the present invention comes in a vehicular hydraulic supply arrangement which features: variable displacement pump means; a lateral acceleration sensor; a vehicle speed sensor; means for estimating the amount of hydraulic fluid which is required to be supplied to a predetermined servo arrangement; means responsive to the vehicle speed sensor and the lateral acceleration sensor for correcting the hydraulic fluid amount estimate; and means responsive to the corrected hydraulic fluid amount estimate for controlling the amount of hydraulic fluid discharged from the variable displacement pump means.

A second aspect of the present invention comes in a vehicular hydraulic fluid supply arrangement which features; variable displacement pump means; sensor means for sensing lateral acceleration, vertical displacement of a vehicle, and vehicle speed; means responsive to the sensor means for estimating the amount of hydraulic fluid which is required to be supplied to a predetermined servo arrangement; and means responsive to the sensor means for correcting the hydraulic fluid amount estimate when both of the lateral acceleration and vehicle speed are above given limits.

A third aspect of the present invention comes in a vehicle which features: a hydraulically operated servo device; a first sensor for sensing a first predetermined parameter which varies with the operation of the hydraulically operated servo device and which is indicative of the amount of hydraulic fluid consumed thereby; variable displacement pump means fluidly coupled with hydraulically operated servo device for supplying hydraulic fluid under pressure thereto; a second sensor for sensing a second predetermined parameter which varies with vehicle speed; a third sensor for sensing a third parameter which varies with the load on the hydraulically operated servo device; means for integrating an output of the first sensor and for using the result of the integration to estimate the amount of hydraulic fluid will be required by the hydraulically operated servo; and means responsive to the second and third sensors for correcting an estimate of the amount of hydraulic fluid which is required to be supplied to the hydraulically operated servo.

DETAILED DESCRIPTION OF THE PREFERRED EMBODIMENTS

The embodiments of the present invention will be disclosed in combination with an active vehicle suspension which utilizes the outputs of forward lateral and vertical accelerometers to control the pressure applied to hydraulic cylinders of a vehicle suspension in a manner which attenuates/prevents pitching, rolling and the like.

Figure 1:
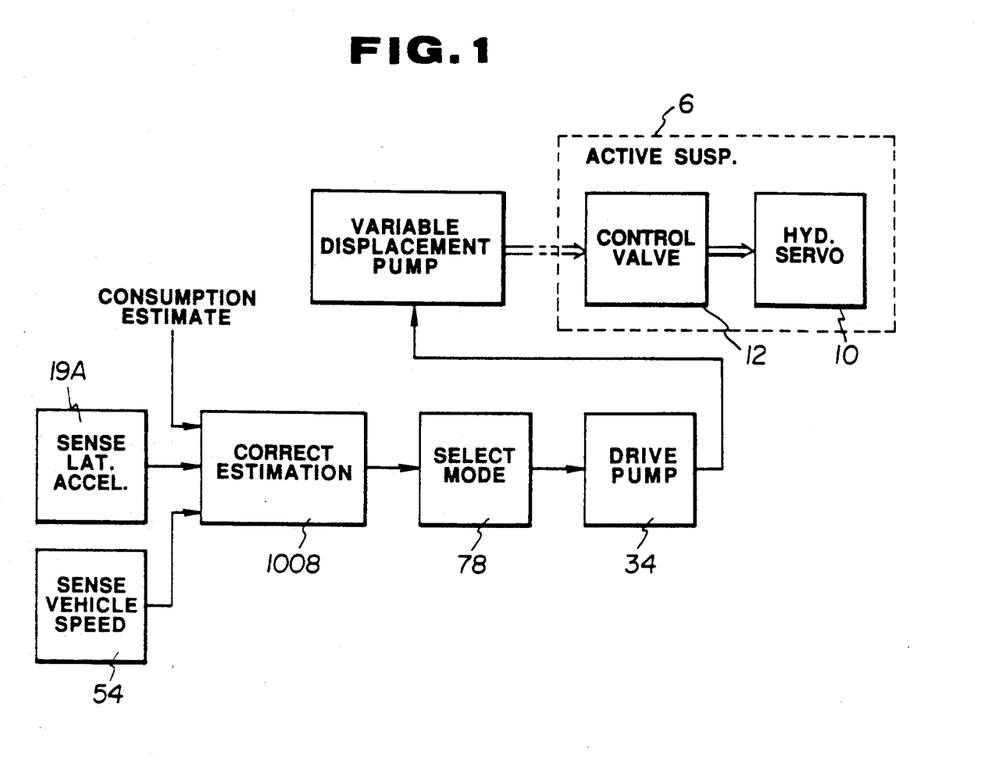
FIG. 1 is a block diagram showing the concept on which the present invention is based.
Figure 2:
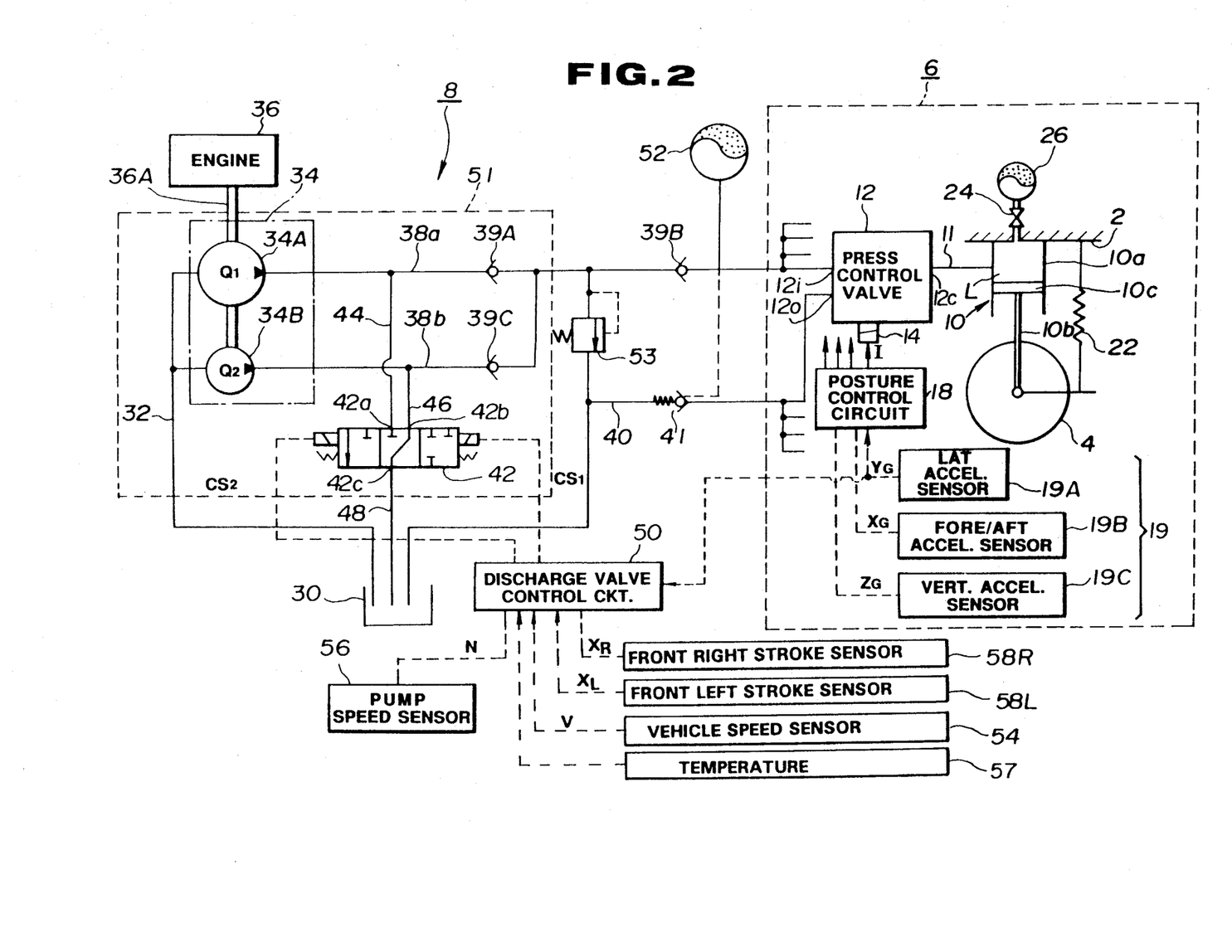
FIG. 2 is a schematic diagram showing a hydraulic fluid supply arrangement combined with an active automotive suspension in accordance with the present invention.

As shown in FIG. 2, a vehicle chassis 2 is operatively connected with road wheel(s) 4 by way of active suspension arrangement(s) generally denoted by the numeral 6, and which are motivated (powered) a source of hydraulic fluid under pressure generally denoted by the numeral 8. Note that for the sake of illustrative simplicity only one of the plurality of suspension arrangement is shown.

Each of the active suspensions 6 includes a hydraulic cylinder 10 and a pressure control valve 12, while they share a posture control circuit 18 and an accelerometer arrangement 19A, 19B, 19C. The hydraulic cylinder(s) 10 each include a cylinder tube 10a which is connected to the vehicle chassis and a piston rod 10b which is connected with the road wheel 4. A piston 10c is connected to one end of the piston rod 10b and reciprocatively received in the cylinder tube 10a in a manner to define a variable volume pressure chamber L. This chamber L is connected to a pressure control valve 12 by way of a conduit 11. This valve has ports 12r, 12o and 12s. The first port 12s is connected with a pump, port 12o is connected with the chamber L via conduit 11 and port 12r is a drain.

Figure 14:
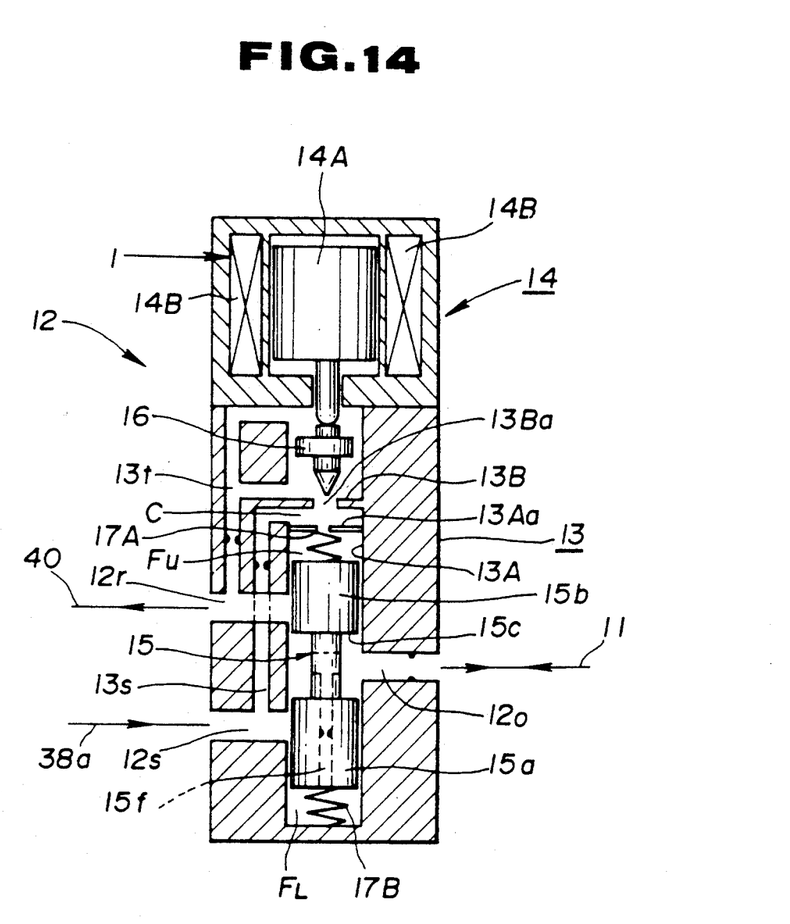
FIG. 14 is a sectional view of a pressure control valve used in the active suspension.

An example of the pressure control valve 12 is shown in FIG. 14. As will be appreciated, this valve includes a cylindrically shaped housing 13, a solenoid device 14 which is fixedly connected to the housing in a manner to be essentially integral therewith. The central portion of the housing is formed with an axial bore 13A in which a main spool 15 and a poppet valve member 16 are disposed. The axial ends of the spool 15 are exposed to pilot pressure chamber FU and a feedback chamber FL. Offset springs 17A and 17B are respectively disposed in these chambers.

It should be noted that a fixed orifice 13Aa is associated with the pilot pressure chamber FU. The main spool 15 is formed with first and second lands 15a and 15b in a manner which defines a pressure control chamber 15c therebetween. The valve body 13 is formed with a supply port 12s, a drain port 12r and the previously mentioned pressure output port 12o. A valve seat 13B is formed in the bore 13 against which the poppet valve element 16 is engageable in a manner to define a variable orifice 13Ba. The valve seat 13B is arranged to cooperate with the fixed orifice 13Aa in a manner to define a pressure chamber C which is in constant fluid communication with the feedback chamber FU. The supply port 12s communicates with the pressure chamber C by way of a transfer passage 13s while the drain port 12r is communicated with the poppet valve side of the valve seat 13B by way of transfer passage 13t. Additionally, the output port 12o fluidly communicates with the feedback chamber FL by way of an axially extending transfer passage structure 15f which is defined in the body of the spool 15.

On the other hand, the solenoid arrangement has a plunger 14A which is motivated by electromagnetic coil 14B. Depending on the level of energization of the coil 14B the plunger 14A is moved in a manner which drives the poppet valve element 16 toward the valve seat 13B and thus varies the amount of hydraulic fluid which is permitted to pass out of the chamber C and flow toward the drain port 12r and thus enables the pressure prevailing in the pilot chamber FU to be controlled.

Figure 3:
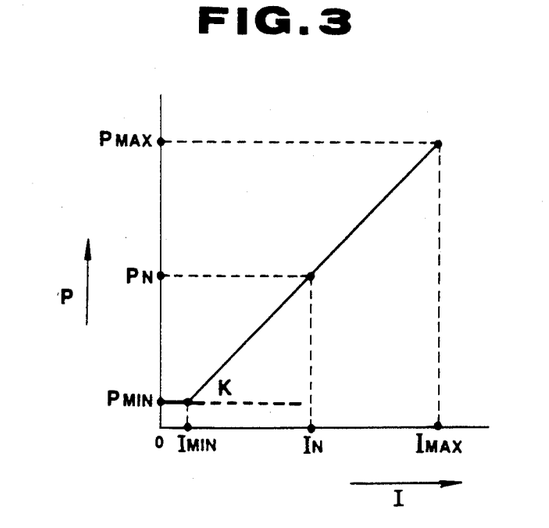
FIG. 3 is a graph showing the operation characteristics of the control valve show in FIG. 2.

Depending on the amount of force which is produced by the solenoid 14 and the resulting displacement of the poppet valve element 16, the pressure prevailing in the chambers FL and FU can be controlled in a manner wherein the spool 15 can be moved to positions wherein communication between the supply port 12s, the output port 12o and the drain port 12r can be selectively modified/cut-off. Viz., as the pressure in the chambers FL and FU is varied, the pressure modulation action of the spool 15 can be controlled to the degree that the pressure which prevails at the output port 12c can be varied in the manner indicated graphically in FIG. 3.

In this arrangement accelerometers 19A, 19B and 19C are arranged to output signals YG, XG and ZG respectively indicative of lateral, fore/aft and vertical accelerations. These G signals are supplied to a vehicle posture control circuit 18 wherein they are modified with predetermined gains (e.g. K1 in FIG. 3) in a manner which enable roll, pitch and bound to be attenuated via determining the appropriate pressures which need to be supplied the hydraulic cylinders associated with the vehicle suspension and issuing the appropriate solenoid energization signals.

It will be noted at this stage that in FIG. 2, the numeral 22 denotes a coil spring which is operatively disposed between the vehicle chassis 2 and the illustrated road wheel 4; while 24 and 26 respectively denote a control valve and pressure accumulator which form vital parts of the suspension.

The source of hydraulic fluid under pressure 8 includes a tank or reservoir 30, an induction conduit 32 which leads to the induction ports of an pump arrangement 34. In this instance the pump arrangement 34 is placed in drive connection with the engine 36 of the vehicle by way of drive shaft 34A. In this instance the pump arrangement includes first and second pumps 34A and 34B each of which have plurality of cylinders and plungers. The first pump 34A is arranged to have a larger displacement than the second one.

Figure 4:
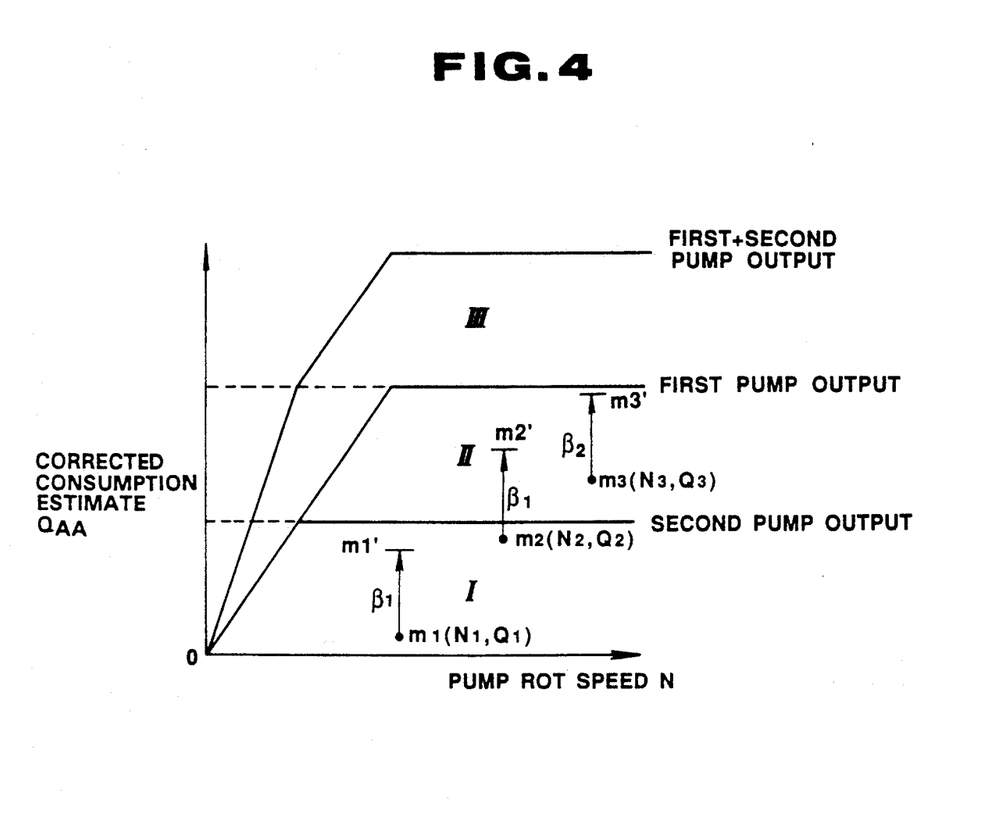
FIG. 4 is a mode control map which is used in connection with a first embodiment the present invention.

The output characteristics of the pump arrangement is graphically shown in FIG. 4. When the demand for hydraulic fluid under pressure is high the output of both pumps are used while in the case of a small demand only the output of the second pump 34B is used. Demands intermediate of the above result in the output of the first pump 34A being utilized.

The discharge port of the first pump 34A communicates with a first supply conduit or passage 38a. This conduit communicates with the supply port 12s of each pressure control valves 12 by way of first and second check valves 39A and 39B. The drain ports 12r of each of the valves is communicated with a drain conduit 40. An operate check valve 41 is disposed in this line and arranged to be responsive to the a pilot pressure in a manner to close and cut-off the drain conduit 40 in response to the situation wherein PP≦PN (wherein PP denotes pilot pressure and PN denotes the pressure currently being used).

The second pump 34B is arranged such that the discharge port communicates with a second supply conduit or passage 38b in which a second check valve 39C is disposed. As shown, this second supply conduit communicates with the first supply passage at a location intermediate of the two check valves 39A and 39B.

The source of hydraulic fluid under pressure 8 further includes a three port three position offset type electromagnetic valve 42. This valve has a first port 42a which is in communication with the first drain conduit 44, a second port 42b which is in communication with the second drain conduit 46 and a third drain port 42c which is in communication with a third drain conduit 48 which leads to a reservoir 30.

A discharge control circuit 50 is connected with the and electromagnetic valve 42 and arranged to supply ON/OFF type mode control signals CS1 and CS2 to first and second solenoids which are associated therewith. When both of the CS1 and CS2 signals assume low levels the spool of the valve 42 assumes a "normal" position wherein port 42a is blocked and communication between ports 42b and 42c is established. When CS1 is ON and CS2 is OFF, the spool assumes a second position wherein all ports are blocked. When CS1 is OFF and CS2 is ON, the spool assumes a third position wherein communication between ports 42a and 42c is established and port 42b is blocked.

A relatively large capacity accumulator 52 is arranged to communicate with the first supply passage 38a at a location downstream of the second check valve 39B.

A relief valve 53 which is arranged to open upon the line pressure exceeding a predetermined level is arranged to communicate with the first supply conduit 38a at a location between the first and second check valves 39A and 39B and downstream of the location where the second supply conduit 38b joins the first one. This relief valve is arranged to relieve the excess pressure into the drain conduit 40.

A vehicle speed sensor 54, a pump rotational speed sensor 56, a temperature sensor 57 and front left and right stroke sensors 58FL and 58FR (which are associated with the front left and right road wheel suspension arrangements) are arranged to input data to the discharge control valve circuit 50. In this case the pump rotational speed sensor 56 is arranged to respond to the rotational speed of the pump drive shaft and to produce an electrical pulse train signal N indicative of the same. More specifically, this sensor can take the form of a magnetic or optical type sensor which generates a train of pulses the frequency of which increase with rotational speed. The stroke sensors can take the form of potentiometer type arrangements and are arranged to produce displacement signals XL and XR respectively.

Figure 5:
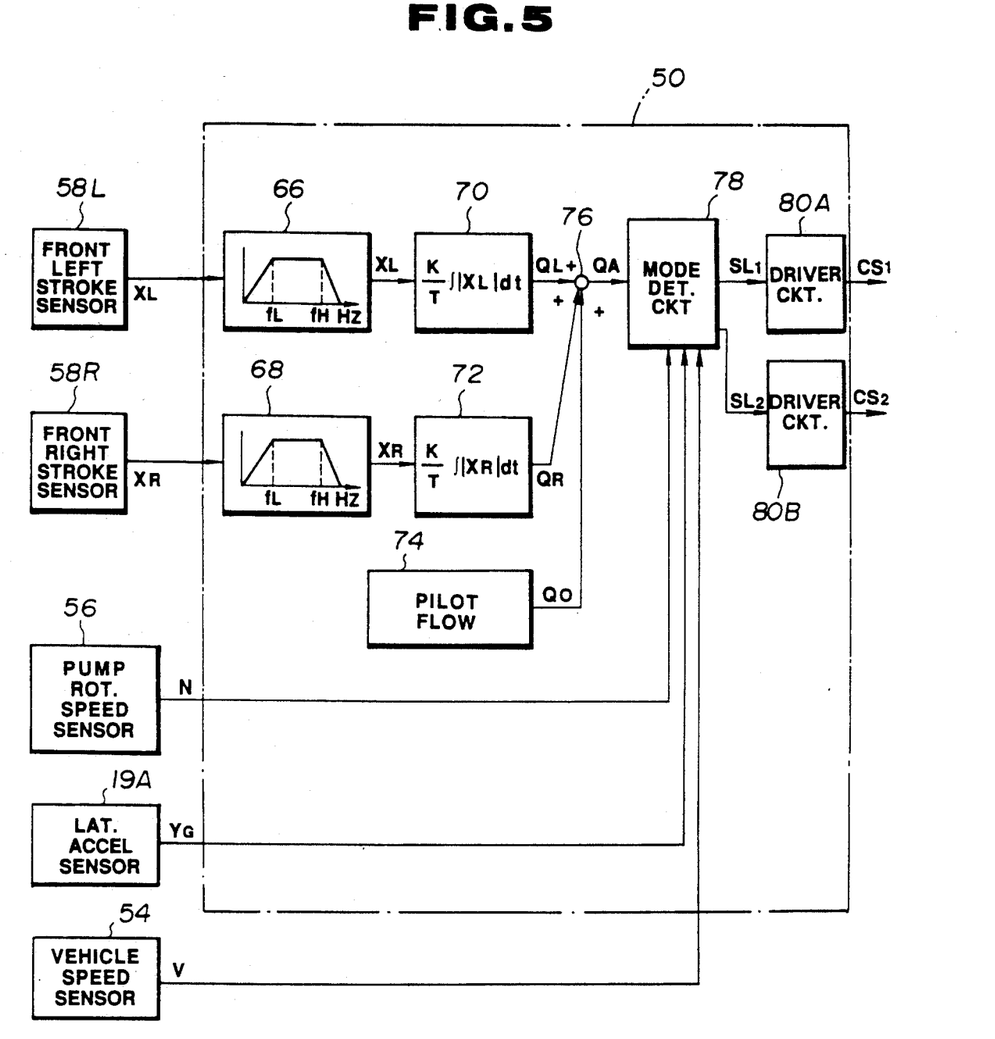
FIG. 5 is a block diagram showing the conceptual arrangement of a control circuit used in accordance with the first embodiment of the present invention.

As schematically shown in FIG. 5, the outputs XL, XR of the stroke sensors 58FL and 58FR are subject to filtering in band pass filters 66, 68 and then subject to integration in integrators 70, 72. The outputs QL, QR of the integrators 70, 72 (which are indicative of flow amounts) are supplied along with a signal Qo indicative of the minimum required flow (generated by a pilot flow determining section or circuit 74) to an adder 76. The output QA of the adder represents a basic or standard estimate of the total amount of hydraulic fluid which is going to be required in view of the instant operating conditions. The signal QA is used in a mode determining circuit 78 in combination with the pump rotational speed signal N, lateral acceleration signal YG and the vehicle speed signal V to determine which mode of valve operation is required in order to relieve the appropriate amount of hydraulic fluid. Depending on the outcome of this decision, suitable command signals SL1 and SL2 are issued to driver circuits 80A and 80B to induce the CS1 and CS2 signals to assume the required levels.

In the instant embodiment the driver circuit 80A is such that when SL1 assumes a high level [1] the switching control signal CS1 assumes an ON level while in the event that SL1 assumes a low level [OFF], the switching control signal CS1 assumes an OFF level.

On the other hand, the driver circuit 80B is such that when SL2 assumes a high level [1] the switching control signal CS2 assumes an ON level while in the event that SL2 assumes a low level [0], the switching control signal CS2 assumes an OFF level.

The band pass filters 66, 68 are arranged such that the lower cut-off frequency fL is set at a value (e.g. 0.5 Hz) which enables the shut out of the change in stroke due to vehicle height adjustment; while the upper cut-off frequency is set at a value (e.g. 6 Hz) which allows the shut of the change in stroke at spring sub-resonance frequencies.

The integrators 70, 72 are arranged to treat the inputs in accordance with the following basic equation:

$$Q = \frac{K}{T} \int |x| dt \qquad (1)$$

That is to say, the stroke change is integrated over a period T (e.g. 2 sec) so that the amount of hydraulic fluid which must be output to each cylinder can be determined based on the total stroke amount:

$$[1/T \cdot \int |x| dt].$$

In the above equation K denotes the hydraulic cylinder pressure receiving area gain.

It should be noted that in connection with the sensed relative movement which takes place between the chassis and the road wheels the movement includes both retraction and elongation. However, as will be appreciated, only during extension is it necessary to introduce hydraulic fluid under pressure from the pump arrangement. Viz., during retraction, hydraulic fluid is exhausted from the cylinders and thus does not require the supply of hydraulic fluid thereto. However, as the same situation holds for the rear wheels, the total stroke as derived using the above mentioned equation (1) can be taken as being indicative of the total stroke requirement for all four wheels.

The derivation of the pilot flow amount performed in the pilot flow determining section 74 is such as to produce a value Qo which is such as to suitably compensate for the hydraulic fluid which is lost by way of leakage in the pressure control valve 12.

By summing the QR, QL and Qo values it is possible to obtain a basic estimate the amount of hydraulic fluid which will be totally required by the system.

In this case the mode determining circuit 78 includes a microprocessor equipped with a memory (e.g. ROM) in which a mode map of the nature shown in FIG. 4 is recorded.

Figure 6:
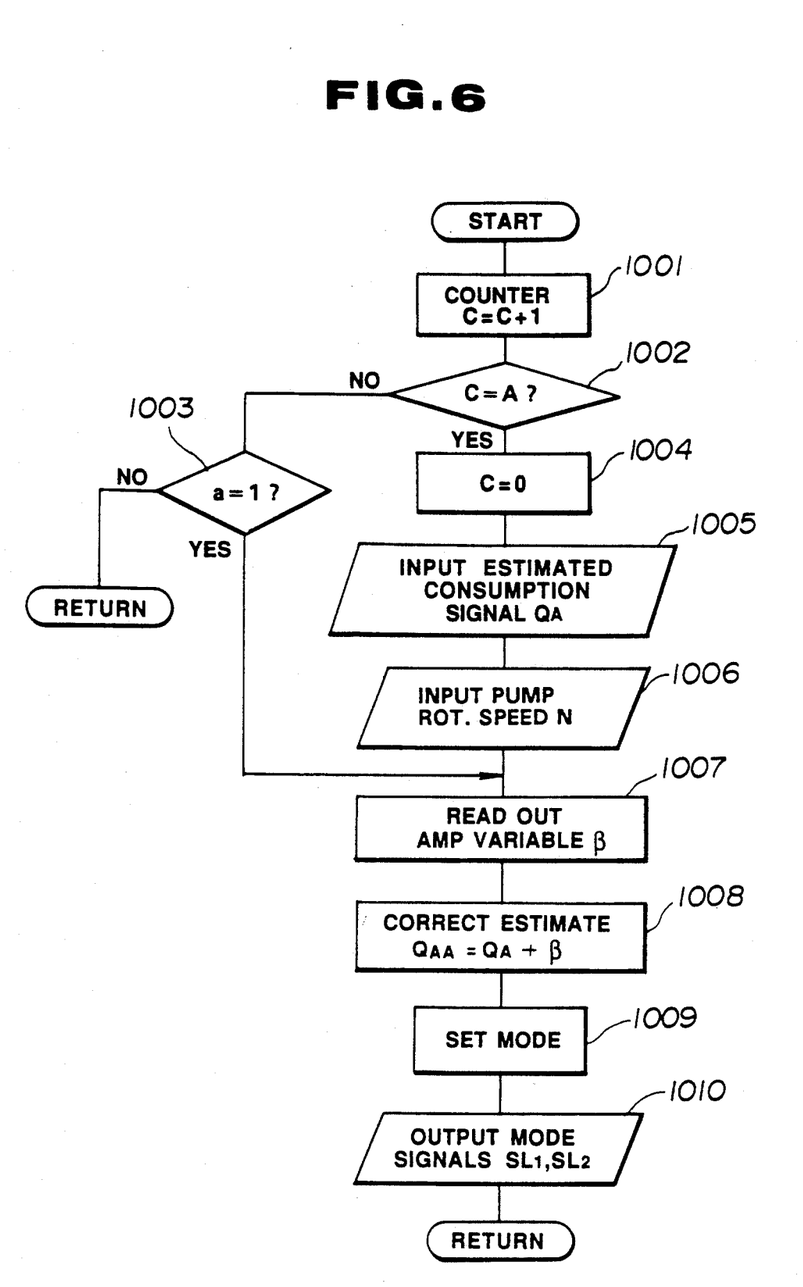
FIGS. 6 and 7 are flow charts which shows the steps which are executed in accordance with control routines which characterize the present invention.
Figure 7:
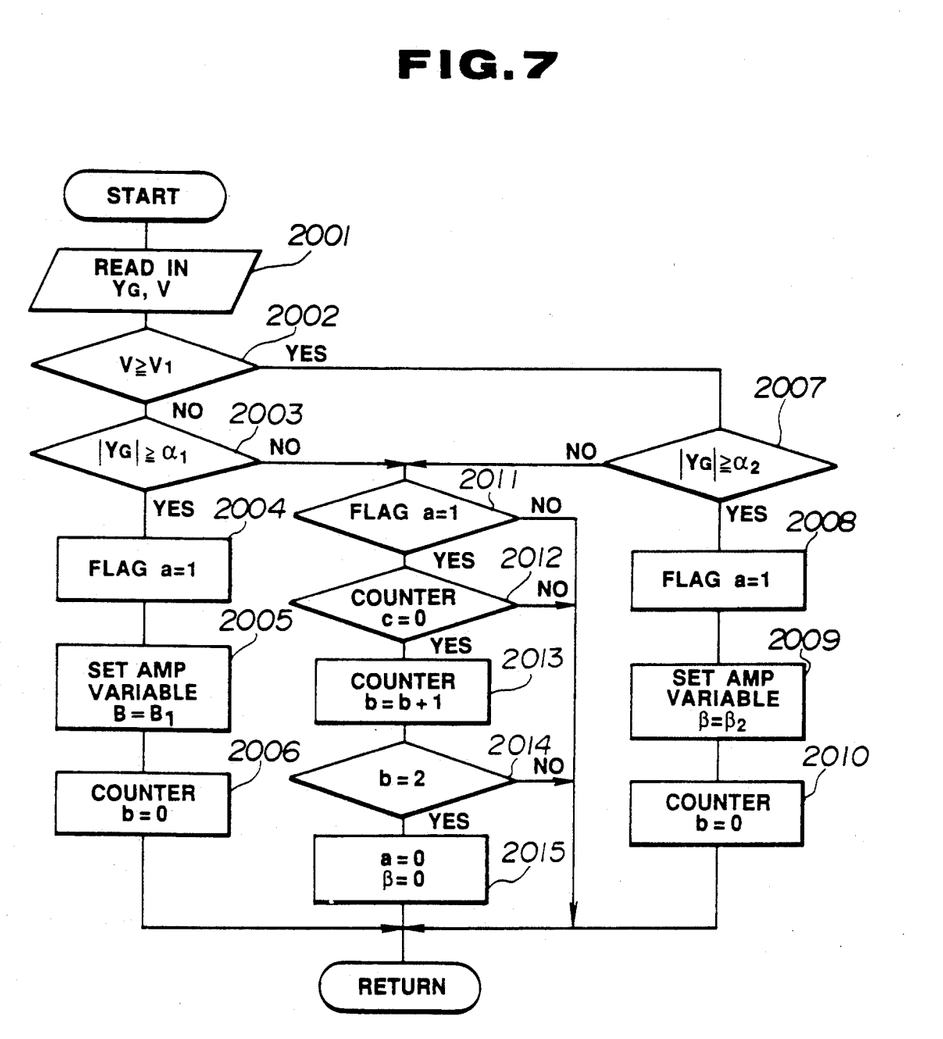

FIGS. 6 and 7 show routines according to a first embodiment of the invention which are run in the above mentioned microprocessor at predetermined time intervals $\Delta t$ (<T). Of these, the routine shown in FIG. 6 is such as to set the required mode in synchronism with the integration period T. In this case mode I is such that the output of the second pump 34B alone is supplied (viz., large pump 34A output is drained) in response to SL1 being set to "0" and SL2 being set to "1", mode II is such that the output of the larger pump 34A alone is supplied (small pump 34B output is drained) in response to SL1 and SL2 being both set to "0" and mode III induced when SL1 is set to "1" and SL2 set to "0".

OPERATION

The operation of the mode determining circuit 78 is such that at predetermined intervals $\Delta t$—for example 20 msec the routines shown in FIGS. 6 and 7 are run via timer interrupt. It will be noted that the flags a, counters b and c and an amplification variable $\beta$ are rest to zero by the main program each time the necessary calculations are completed.

More specifically, the first 1001 step of the FIG. 6 routine is such as to increment a counter c. At step 1002 the count of counter c is compared with a value A to determine if the integration time T has lapsed or not (viz., $T = \Delta t \cdot A$). In the event that the c count has not reached A the routine goes across to step 1003 wherein the status of a flag a1 is determined. This flag is such as to indicate if the lateral acceleration is above a predetermined level or not or if a mode hold timer which is intiated in response to the predetermined level being exceeded, has not yet expired.

In the event that flag a has not yet been set, the routine returns and the instant mode is maintained.

In the event that it is found that C=A in step 1002 the routine goes to step 1004 wherein a counter c is cleared and then to steps 1005 and 1006 wherein the values of QA and N (basic consumption estimate and pump speed) are read in.

Next in step 1007 an amplification variable $\beta$ which is set in the routine shown in FIG. 7 is read out of memory.

In step 1008 the values of QA and $\beta$ are summed in a manner to provide a corrected basic consumption estimate QAA. The QAA and N values are then used in connection pre-recorded data which is mapped in the manner depicted in FIG. 4, in order to determine the mode which is most appropriate for the instant set of operating conditions. In the event that mode I is indicated, SL1 is set to [0] and SL2 is set to [1], if mode II is nominated then SL1=0 and SL2=0, while in the case of mode III SL1=1 and SL2=0. In step 1010 SL1 and SL2 signals based on the mode selection are output to the driver circuits 80A and 80B.

However, in the event that flag a is found to have been set in step 1003, indicating that the lateral acceleration has exceeded a basic value, the routine by-passes steps 1004-1005 and proceeds directly to step 1007.

It should be noted that this allows for the situation wherein the lateral acceleration exceeds the basic value synchronously with the mode setting timing which occurs at intervals T.

The routine shown in FIG. 7 is such that in step 2001 the instant lateral acceleration and vehicle speed values of YG and V are read in and in step 2002 the instant vehicle speed is compared with a predetermined slice value V1. In the event that V<V1 the routine goes to step 2003 wherein the absolute value of the instant YG value is compared with a first lateral acceleration slice level $\alpha 1$. In the event that the |YG| value is greater than $\alpha 1$ (|YG|$\geq \alpha 1$) the routine goes to step 2004 wherein flag a is set (a=1) and then proceeds to step 2005 wherein the amplification variable $\beta$ is set as a predetermined value $\beta 1$. Following this, in step 2006 the counter b is cleared and the routine returns to the main program until the next time interrupt.

However, in the event that it is found that the instant vehicle speed V greater than or equal to V1 in step 2002 the routine proceeds across to step 2007 wherein the absolute value instant lateral acceleration is compared with a second smaller predetermined slice value $\alpha 2$ ($\alpha 2 > \alpha 1$). In the event that |YG|$\geq \alpha 2$ the routine goes to steps 2008-2010 wherein flag a is set, $\beta$ is set to a second smaller predetermined value $\beta 2$ ($\beta 2 > \beta 1$) and counter b is cleared.

On the other hand, if it is found that |YG|<$\alpha 2$ in step 2007, or alternatively, if |YG| is found to be less than $\alpha 1$ in step 2003, the routine goes to step 2011 wherein the instant status of flag a is checked. If a=0 the routine returns. However, in the event that a=1 the routine proceeds to step 2012 wherein the instant count of counter c is checked. If c=1 the routine proceeds to step 2013 wherein counter b is incremented. Next in step 2014 is determined if the count of counter b has reached 2 or not. This provision ensures that the routine will pass through steps 2011-2014 twice and ensure that following the occurrence of relatively large vehicle roll, the instant mode will be maintained for at least time T (i.e., $T = \Delta t \cdot A$).

In other words, in the event that step 2014 renders a negative outcome, it is deemed that counter c has not clocked up to A and been cleared twice (steps 1001-1003) and a hold time Tf+T ($0 \leq Tf < T:Tf$) has not yet been exceeded and the routine is directed to by-pass step 2015. Upon counter b reaching 2 the routine is directed to return via step 2015 wherein flag a is cleared and the value of $\beta$ is set to zero.

The operation of the overall arrangement is such that when the vehicle is traversing a smooth road at a steady velocity below the slice level value V1, the operate check valve 41 is open, the supply and drain conduits are placed in communication and the relief valve 53 functions to control the level of the pump discharge to a predetermined line pressure level.

Under these conditions, the vibration which is transmitted to the chassis from the road surface induces very little change in the amount of stroke. As a result, the outputs XL and XR of the stroke sensors 58FL and 58FR exhibit almost no change, and the output components of the band pass filters 66, 68 assume values close to zero. As a result QA$\simeq$Qo. At this time as the vehicle speed V is less than the slice level V1 used in the FIG. 7 routine, said routine flows through steps 2002 to step 2003. Given that the vehicle proceeds in a straight line and the lateral acceleration YG$\simeq$ 0, the routine proceeds via steps 2011-2015, flag a is set to zero and the value of amplification variable $\beta$ is set at zero.

In response to this the routine shown in FIG. 6 is such as flow through steps 1001, 1002, 1003-1010. The point defined by the instant QAA and N values—viz., the point defined at coordinates N1. Q1 falls in the mode I zone and as a result mode I is selected. In response to this, the mode selection circuit 78 outputs signals SL1=0 and SL2=1. This results in CS1 and CS2 assuming OFF and ON states respectively. The solenoid valve 42 is therefore conditioned to assume the first position wherein the output of the larger of the two pumps 34A is drained thus negating the load imposed on the prime mover the same, and the output of the smaller of the two pumps 34B alone is used to establish the line pressure.

In other words, at low vehicle speeds when the vehicle is running slowly along a good surface, the amount of consumption by the cylinders 10 is small and the variable displacement pump arrangement is conditioned produce a small discharge.

Further, when the vehicle is running in straight line at low speeds and enters either a left or right turn, and the absolute value ($|YG|$) of lateral acceleration YG exceeds the slice level $\alpha 1$ the routine shown in FIG. 7 is such as to proceed from step 2013 to 2014 and result in flag a being set (a=1), the amplification variable being set to $\beta 1$ ($\beta = \beta 1$) and counter b being cleared (b=0). As a result, the routine shown in FIG. 6 responds by proceeding from step 1002 to 1003 and from there to steps 1007, or from step 1002 to step 1007 via steps 1004-1006. In step 1007 the amplification variable $\beta$ which is read out is $\beta 1$ and in step 1008 the basic consumption estimate QA is increased by adding $\beta 1$ thereto. This increases the value of QAA. Assuming that the value of N remains unchanged, the point m1 (QA=Q1=QAA) defined by the new QAA and N values moves upwardly as indicated (viz., QAA=Q1+$\beta$). In this example the point remains in the mode I zone and as a result mode I continues to be selected.

In the event that the point defined by the instant QA and N values is m2, and QA=Q2, upon correction via the addition of $\beta 1$ the point m2 moves upwardly into zone II as shown. In this instance the electromagnetic valve 42 is induced to move from its "normal" position to the second position wherein the output of the smaller pump 34B is drained and the output of the larger pump 34A is used to develop line pressure.

Under these low vehicle speed conditions wherein a relatively large lateral acceleration is encountered the routine shown in FIG. 7 proceeds through step 2006 wherein counter b is cleared and until the predetermined mode hold time TF+T expires, flag a is maintained in a set condition and $\beta 1$ is selected to be added to the QA value in order to obtain QAA.

When the TF+T hold time expires, if the absolute value of the acceleration $|YG|$ is less than the slice level $\alpha 1$, the routine goes to step 2015 wherein flag a is cleared and the amplification variable $\beta$ set to zero. Accordingly, the mode is determined only on the QA value output from the adder 76.

Simultaneously, with the above mode setting operations, the posture control circuit 18 varies the levels of the currents which are supplied to the solenoids 14 of the pressure control valves 12 so that the appropriate amount of hydraulic fluid is supplied into the chambers L so that the pressure prevailing in the cylinders which are on the side toward which the vehicle is tending to roll is increased and the pressure prevailing in the cylinders on the other side of the vehicle is reduced. This resists the tendency for the vehicle to roll and stabilizes the cornering of the vehicle.

When the road surface on which the vehicle is running changes from a smooth one to a bumpy one, depending on the vehicle speed, the frequency and amplitude of the stroke valves XL and XR are effected in a manner which requires an increase in the QA value. However, while the lateral acceleration YG is low, the value of $\beta$ is set to zero and the setting of the pump mode is not effected by the same. Instead, the posture control circuit 18 responds to output ZG of the vertical acceleration sensor 19C in a manner which increases the level of the currents I being supplied to the solenoids of the pressure control valves 12.

When the vehicle speed exceeds the V1 slice level the routine shown in FIG. 7 is such as to flow across to step 2007 and thus induce the situation wherein the slice level against which the absolute value of the lateral acceleration ($|YG|$) is compared is changed from $\alpha 1$ to $\alpha 2$. In this case $\alpha 2$ is lower than $\alpha 1$ and can be exceeded more readily than in the case of low speed when $\alpha 1$ is used and result in the setting of flag a. Further in the case that $|YG| > \alpha 2$ the value of $\beta$ is set to $\beta 2$ ($\beta 2 < \beta 1$).

Figure 8:
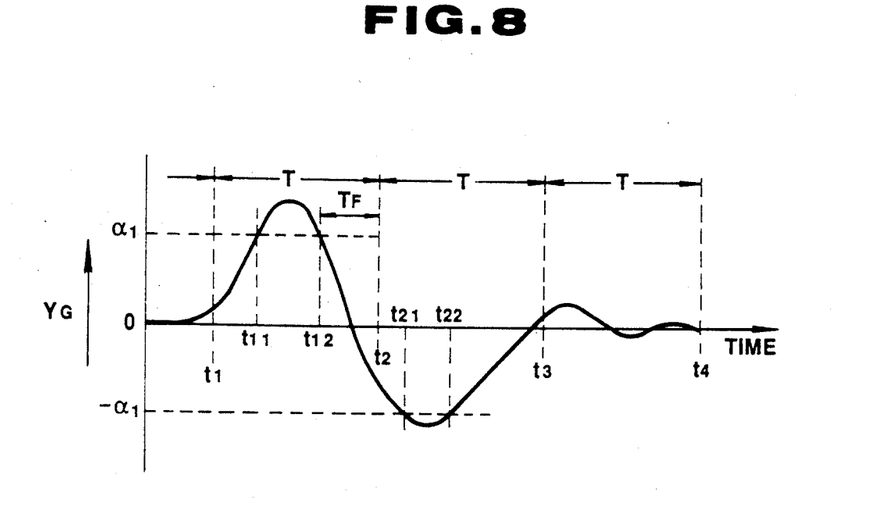
FIG. 8 is a graph showing the changes in the lateral acceleration $Y_G$ which occur with respect to time and the manner in which control timings are set.

Accordingly, as different from the case wherein the vehicle is travelling in a high speed zone ($V \geq V1$) along a smooth surface and the lateral acceleration YG fluctuates in the manner depicted in FIG. 8, and the absolute value of the lateral acceleration $|YG|$ is such as to exceed the second slice level $\alpha 2$ during the periods t11~t12 and t21~t22, in the case of low speed operation (V<V1), the first slice level $\alpha 2$ would not be reached during said periods, the pump operation would remain in mode I and the accumulator relied on to supplement hydraulic fluid under such conditions.

However, under the conditions wherein $|YG| \geq \alpha 2$ during t11~t12, the routine shown in FIG. 7 would pass through steps 2002, 2007~2010 and set $\beta = \beta 2$ and a=1. As a result, the routine shown in FIG. 6 would be induced to pass through steps 1001, 1003 and 1007~1010. Given that the QA and V values under such conditions defined point m1 (FIG. 4) the addition of $\beta 2$ would move the point up into the mode II region in the same manner as the addition of $\beta 1$ and result in the mode being increased by one rank.

Basically, the above system is such that only when the lateral acceleration level rises above one of $\alpha 1$ and $\alpha 2$ is the level of QA modified by the addition of one of $\beta 1$ or $\beta 2$. This of course reduces the amount of pump load which is placed on the prime mover and thus reduces the amount of fuel which is consumed. In addition when the lateral acceleration fluctuates rapidly and the value of $|YG|$ passes back and forth across the slice level in a manner similar to a pulse train, chattering (rapid hunting between modes) is attenuated by the provision of steps 2011~2015 which ensures that once a given mode is selected it will be maintained for a predetermined time following the $|YG|$ level falling below the slice level.

When the engine is stopped and the ignition switch assumes an OFF position, the output of the pumps falls to zero. At this time the operate check valve 41 closes and closes the drains of the pressure control valves 12. The pressure assumes a level PN and the vehicle posture becomes flat.

On the other hand, in the event that vehicle is subjected to a high speed slalom course, the lateral acceleration rises and the pump mode is elevated in a manner which enables the supply of hydraulic fluid to be maintained at level which ensure stable anti-roll control.

SECOND EMBODIMENT

Figure 10:
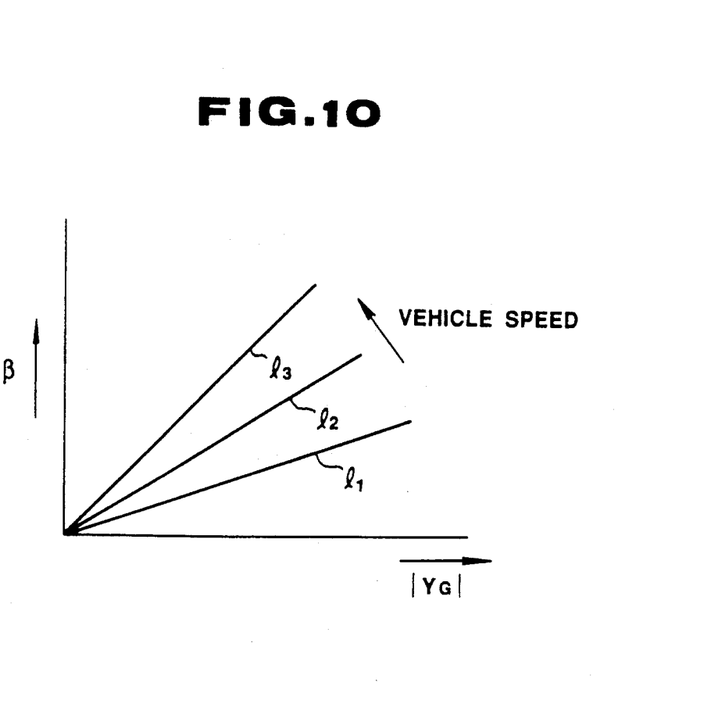
FIG. 10 is a graph which shows the manner in which the amplification variable $\beta$ is recorded in terms of vehicle speed and lateral acceleration in accordance with a second embodiment of the present invention.
Figure 11:
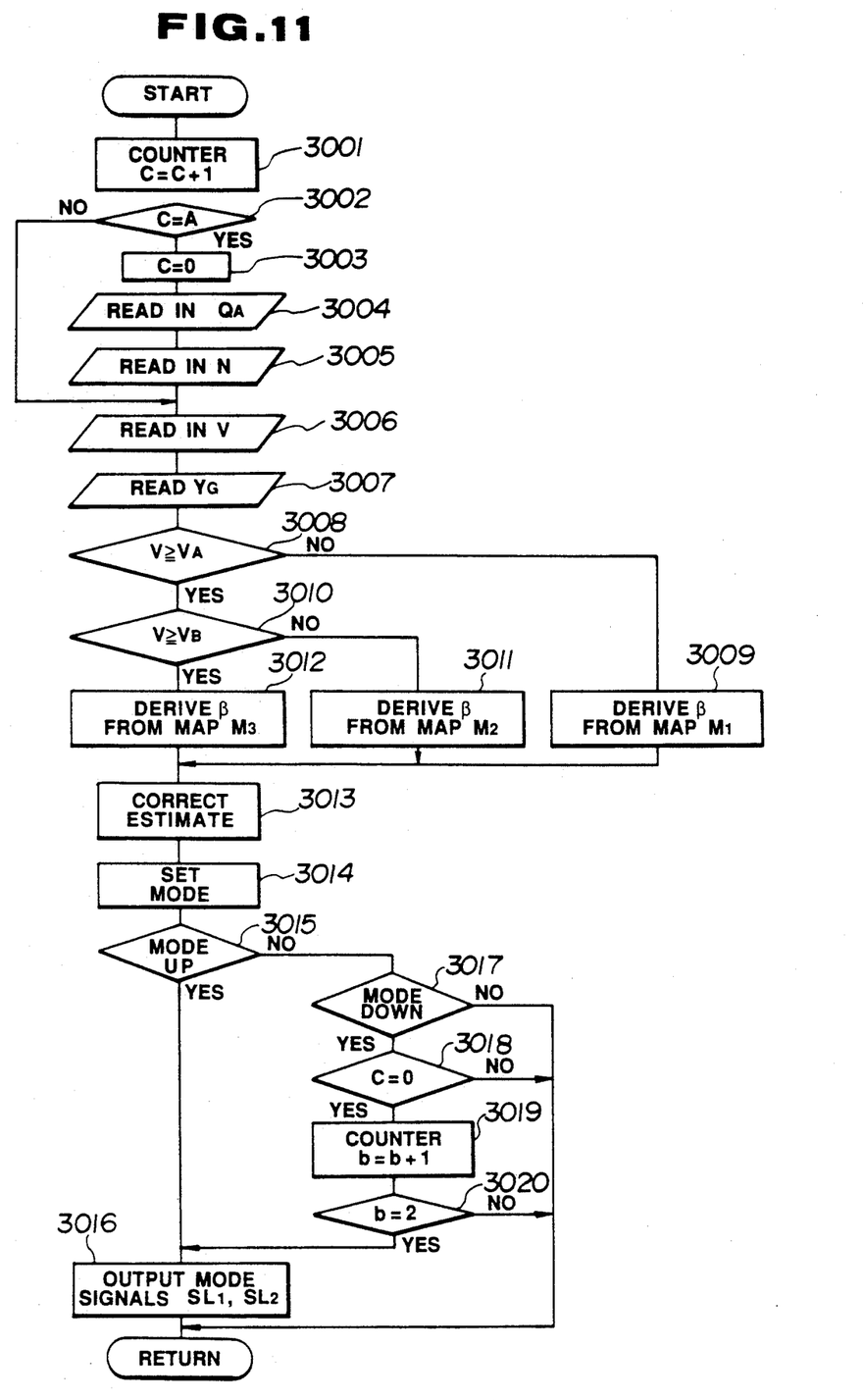
FIG. 11 is a flow chart which shows a routine via which mode settings are determined in accordance with the second embodiment of the present invention.

FIGS. 10 and 11 show a second embodiment of the present invention. This embodiment is directed to increasing the number of $\beta$ values which can be selected and thus increase the flexibility (resolution) with which adjustment of the QA value can be carried out. In brief, the $\beta$ data is divided in three maps M1~M2 which correspond in content to the traces l1-l3 shown FIG. 10.

The routine which is shown in FIG. 11 is run via interrupt at predetermined time intervals and such that the first five steps 3001-3005 are the same as steps 1001, 1002 and 1004~1006.

At steps 3006 and 3007 the instant vehicle speed and lateral acceleration values V, YG are read in. In steps 3008 and 3010 the instant vehicle speed V is compared with first and second vehicle speed values VA and VB. In this case VA<VB. This allows the vehicle speed to be sorted into one of three ranges—less than VA, between VA and VB and greater than VB and for the routine to be appropriately directed to one steps 3009, 3011 and 3012. That is to say, in the event that the vehicle speed is found to be below VA the routine goes to step 3009 wherein a value of $\beta$ is read out based on the instant IYGI value. On the other hand, if the speed is found to be between VA and VB the routine proceeds to step 3011 wherein $\beta$ is derived from map M2. In the event that the value of V>VB the routine goes to step 3012 and derives a $\beta$ value using map M3.

In step 3013 the value of $\beta$ which has been derived based on the instant vehicle speed and IYGI values, is used to correct the QA value and derive a QAA value which is appropriate for the instant set of operating conditions. Following this, in step 3014 the instant QAA value is used in a table look-up using the mapped data of the nature depicted in FIG. 4 to determine which mode should be implemented. In step 3015 the determined mode is compared with the one currently being implemented and the determination made if the mode should be upgraded or not. In the event that the mode should be upgraded, the routine goes to step 3016 wherein the mode determined in step 3014 is set as the current mode and the appropriate SL1 and SL2 signals issued to the driver circuits 80a and 80b.

On the other hand, if the outcome of step 3015 is negative, the routine proceeds across to step 3017 wherein it is determined if the determined mode is lower than the one currently being implemented. Viz., it is determined if a mode down operation is required or not. In the event of a negative outcome, it is deemed that the instant mode is the same as the one just determined in step 3014 and the routine returns. On the other hand, in the event that instant mode is found to be higher than the just determined, the routine enters steps 3018 to 3020 which perform the same mode holding function as described in connection with steps 2012~2015. Following the expiration of this hold time, the routine goes to step 3016 and reduces the mode level.

ALTERNATIVES

Figure 12:
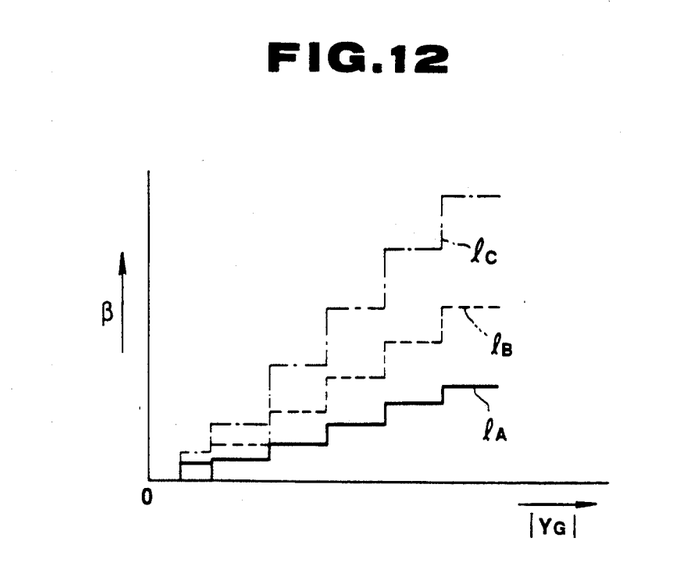
FIGS. 12 and 13 are graphs which depict the manner in which the amplification variable $\beta$ is recorded in accordance with third and fourth embodiments of the invention.
Figure 13:
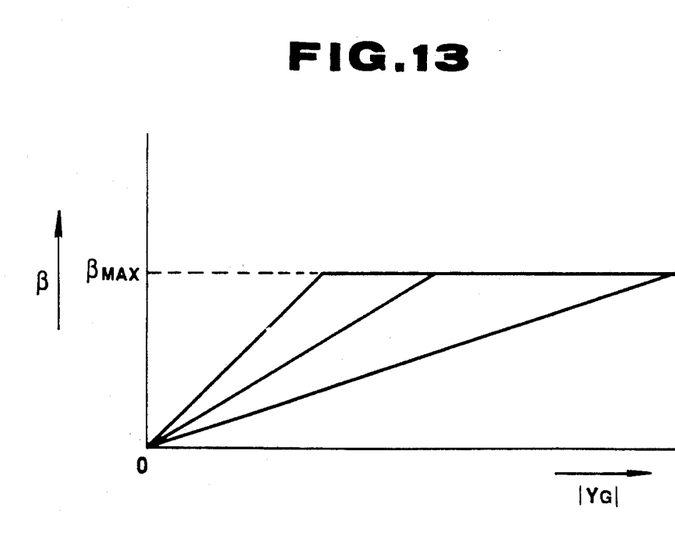

It will be noted that the present invention is not limited to the straight line characteristics shown in FIG. 10 and it is possible to use mapped data of the nature depicted in FIGS. 12 and 13 for example. As shown, the data can be mapped in stepwise manner or alternatively can be limited to an upper value $\beta$max in the manner shown in FIG. 13. The latter mentioned $\beta$max limit can be selected in conjunction with the inclination of the traces in manner which enables the accumulator 52 to be maintained fully charged but avoid wasteful pump beyond the same.

The other data arrangement possibilities will be obvious to those skilled in the instant art.

In addition, the present invention is not limited to modifying the QA value which is based on the stroking of the hydraulic cylinders associated with the vehicle suspension and a set value can be used which is increased following the lateral acceleration rising sufficiently.

Alternatively, instead of sensing the stroking amount it is within the scope of the present invention to estimate the same such as by using the G sensor inputs. Further, the present invention is not limited to use with hydraulic cylinders and any type of hydraulic fluid operated servo can be combined therewith.

The invention is not limited to the use of the described type of electromagnetic valve 42 and a two position three port arrangement can be alternatively used. Additionally the number of mode the pump arrangement can be operated is not limited to three and can be reduced to two, for example. Additionally, the second pump 34B can be dispensed with and pump 34A replaced with a single infinitely variable displacement type if so desired.

The discharge control valve control circuit 50 can be included in, or comprise a microcomputer including control circuit which is adapted for a number of applications other than those specified above.

Figure 9:
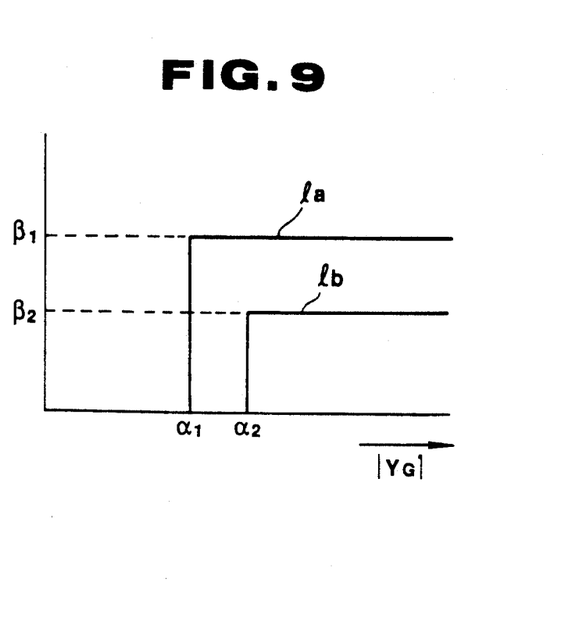
FIG. 9 is a graph which shows the relationship which exists between lateral acceleration and an amplification variable $\beta$ which is used in connection with the control which characterizes the first embodiment of the present invention.

In the first embodiment the $\alpha 1$ $\alpha 2$ and $\beta 1$ and $\beta 2$ values can be arranged to have a relationship of the nature depicted by traces la and lb in FIG. 9, if so desired.

The various other variations which are possible without departing from the scope of the present invention will be apparent to those skilled in the instant art.

What is claimed is:

1. A vehicular hydraulic fluid supply arrangement comprising:
    variable displacement pump means;
    a lateral acceleration sensor;
    a vehicle speed sensor;
    means for estimating the amount of hydraulic fluid which is required to be supplied to a predetermined servo arrangement;
    means responsive to said vehicle speed sensor and said lateral acceleration sensor for correcting the hydraulic fluid amount estimate; and
    means responsive to the corrected hydraulic fluid amount estimate for controlling the amount of hydraulic fluid discharged from said variable displacement pump means.

2. A vehicular hydraulic fluid supply arrangement as claimed in claim 1 wherein said variable displacement pump means comprises first and second synchronously driven pumps, and valve means for selectively draining the outputs of the first and second pumps, the first pump having a displacement which is larger than the second pump.

3. A vehicular hydraulic fluid supply arrangement as claimed in claim 1 wherein the predetermined servo device comprises an active vehicle suspension which includes a hydraulic cylinder having a variable volume working chamber into which hydraulic fluid can be supplied from said variable displacement pump means.

4. A vehicular hydraulic fluid supply arrangement comprising:
   variable displacement pump means;
   sensor means for sensing lateral acceleration, vertical displacement of a vehicle, and vehicle speed;
   means responsive to said sensed vertical displacement for estimating the amount of hydraulic fluid which is required to be supplied to a predetermined servo arrangement; and
   means responsive to said sensed lateral acceleration and vehicle speed for correcting the hydraulic fluid amount estimate; and
   means responsive to the corrected hydraulic fluid amount estimate for controlling the amount of hydraulic fluid discharged from said variable displacement pump means.

5. In a vehicle
   a hydraulically operated servo device;
   a first sensor for sensing a first predetermined parameter which varies with the operation of the hydraulically operated servo device and which is indicative of the amount of hydraulic fluid consumed thereby;
   variable displacement pump means fluidly coupled with hydraulically operated servo device for supplying hydraulic fluid under pressure thereto;
   a second sensor for sensing a second predetermined parameter which varies with vehicle speed;
   a third sensor for sensing a third parameter which varies with the load on the hydraulically operated servo device;
   means for integrating an output of the first sensor and for using the result of the integration to estimate the amount of hydraulic fluid which is required by the hydraulically operated servo;
   means responsive to said second and third sensors for correcting the hydraulic fluid amount estimate; and
   means responsive to the corrected hydraulic fluid amount estimate for controlling the amount of hydraulic fluid discharged from said variable displacement pump means.

6. A vehicular hydraulic fluid supply arrangement as set forth in claim 1, wherein said correcting means corrects the hydraulic fluid amount estimate with a correction value which is variable in response to an output of said vehicle speed sensor.

7. A vehicular hydraulic fluid supply arrangement as set forth in claim 6, wherein said correction value is set to a first fixed value when said output of the vehicle speed sensor is smaller than a predetermined value, and to a second fixed value when said output of the vehicle speed sensor is not smaller than said predetermined value.

8. A vehicular hydraulic fluid supply arrangement as set forth in claim 7, wherein said correcting means corrects the hydraulic fluid amount estimate when an output of the lateral acceleration sensor is above a given value which is variable in response to the output of the vehicle speed sensor.

9. A vehicular hydraulic fluid supply arrangement as set forth in claim 6, wherein said correction value is linearly increased depending on the output of the lateral acceleration sensor.

10. A vehicular hydraulic fluid supply arrangement as set forth in claim 6, wherein said correction value is stepwise increased depending on the output of the lateral acceleration sensor.

11. A vehicular hydraulic fluid supply arrangement as set forth in claim 6, wherein said correction value is variable depending on the output of the lateral acceleration sensor and is defined by a plurality of variation characteristics, and wherein said correcting means selects one of the variation characteristics in response to the output of the vehicle speed sensor.

* * * * *